United States Patent
Shin et al.

(10) Patent No.: US 6,957,665 B2
(45) Date of Patent: Oct. 25, 2005

(54) FLOW FORCE COMPENSATING STEPPED SHAPE SPOOL VALVE

(75) Inventors: Weon Gyu Shin, Daejeon (KR); Hyun Young Choi, Daejeon (KR); Hyo Pil Shin, Daejeon (KR); Eui Joon Moon, Daejeon (KR); Jong Yeol Kim, Chunan (KR)

(73) Assignees: Agency for Defense Development, Daejon (KR); Hanwha Corporation, Seoul (KR)

( * ) Notice: Subject to any disclaimer, the term of this patent is extended or adjusted under 35 U.S.C. 154(b) by 0 days.

(21) Appl. No.: 10/371,495

(22) Filed: Feb. 20, 2003

(65) Prior Publication Data

US 2004/0000347 A1 Jan. 1, 2004

(30) Foreign Application Priority Data

Jun. 27, 2002 (KR) .................................. 2002-36468

(51) Int. Cl.$^7$ ............................................... F15B 13/04
(52) U.S. Cl. ................... 137/625.69; 251/282
(58) Field of Search ...................... 137/625.69; 251/282

(56) References Cited

U.S. PATENT DOCUMENTS

| | | | | |
|---|---|---|---|---|
| 3,123,335 A | | 3/1964 | Darling | |
| 3,807,454 A | * | 4/1974 | Westveer | 137/625.69 |
| 4,155,535 A | * | 5/1979 | Seamone | 137/625.69 |
| 4,220,178 A | | 9/1980 | Jackson | |
| 4,313,467 A | * | 2/1982 | Lang | 137/625.3 |
| 4,646,786 A | * | 3/1987 | Herder et al. | 137/625.69 |
| 4,651,776 A | * | 3/1987 | Nakano et al. | 137/625.69 |
| 5,329,841 A | * | 7/1994 | Sauer et al. | 137/625.69 |
| 5,944,042 A | | 8/1999 | Takahashi et al. | |
| 2003/0024581 A1 | * | 2/2003 | Nakamura et al. | 137/625.69 |

* cited by examiner

Primary Examiner—Gerald A. Michalsky
(74) Attorney, Agent, or Firm—Scully, Scott, Murphy & Presser

(57) ABSTRACT

Disclosed is a flow force compensating spool valve having a flow force compensating protrusion ring at a supply channel of a sleeve on an outer circumference portion of a spool rod, and a hydraulic valve, a pneumatic valve, a three-way valve, and a four-way valve using the spool valve, in which the flow force can be compensated by a simple structure change of the spool without changing a structure of the sleeve.

4 Claims, 4 Drawing Sheets

FLOW FORCE COMPENSATING STEPPED SHAPE SPOOL VALVE

BACKGROUND OF THE INVENTION

1. Field of the Invention

The present invention relates to a spool valve, and more particularly, to a spool valve structure which can compensate flow force applied to the spool in a sleeve by changing the shape of a spool rod.

2. Description of the Background Art

A spool valve indicates a valve which opens and closes a channel by a spool which moves toward a longitudinal direction of the spool rod in a sleeve.

FIG. 1 is a cross-sectional view showing a structure of a general spool valve in accordance with the conventional art.

As shown, the conventional spool valve comprises a supply channel 11(11a, 11b); a sleeve 10 having a return channel 12; and a spool 20 having a plurality of spool lands 21 connected to one another as a unit by a spool rod 22. The spool 20 reciprocates in the sleeve 10 toward the longitudinal direction of the spool rod, thereby opening and closing the channels 11 and 12.

In the sleeve 10, one or two control channel 13(13a, 13b) is formed, which is called as a three-way control valve or a four-way control valve according to the number of entire channels.

Herein, a flow of fluid which passes the spool valve will be explained.

The fluid supplied through the supply channel 11 passes a metering orifice formed by a narrow space between an end portion of the supply channel 11 and the spool land 21, thereby forming a fast flow. The fast flow is reflected by the spool rod 22 and then flows out through the control channel 13 and or the return channel 12.

A magnitude of the flow force applied to the spool 20 by the fluid is equal to that of a force by a pressure applied to a wall of the spool land 21, and a direction of the flow force is opposite to that which the spool moves, that is, a direction which the metering orifice is closed.

The flow force will be expressed as follows by forces applied to each part A, B, C, D, and E of the spool valve shown in FIG. 1

$$F_{flow\ force} = -F_A + F_C - F_D + F_E$$

When the flow force becomes large, a force required to move the spool of the valve also becomes great, so that a size of the entire valve or a capacity of a driving motor has to be increased.

Accordingly, many methods for reducing or perishing the flow force of a steady state have been proposed. However, only some parts of the methods were successful and the other parts were impractical.

In the American patent of a number U.S. Pat. No. 4,220,178, a method for changing a shape of the spool rod (a shank of the spool) of a hydraulic control valve is proposed to change an exchange of a movement amount between the spool and a high pressure fluid so that many kinds of dynamic forces applied to the spool be balanced one another.

The shank is formed to have an angle smaller than an inflow angle in order to reduce the flow force which can be generated at the spool.

However, said method accompanies one disadvantage that a maximum diameter of the spool land is increased when compared with a structure of the conventional spool and has a problem that a shape of an exit ramp is not easily and precisely fabricated.

Also, in the American patent of a number U.S. Pat. No. 5,944,042, a method for compensating the flow force by using a re-circulation land is proposed.

A hydrostatic bearing is formed in the sleeve and a groove is formed in the spool land to compensate the flow force by a recirculation generated by the structure.

However, said method requires a structure change of the sleeve itself, so that a fabricating cost is excessively increased and a precise fabrication is impossible.

Also, in the American patent of a number U.S. Pat. No. 3,123,335, a method for compensating the flow force by forming a notch at the spool land is proposed. However, said method requires a structure change of the sleeve itself, thereby excessively increasing a fabricating cost and not being able to fabricate accurately.

SUMMARY OF THE INVENTION

Therefore, an object of the present invention is to provide a spool valve which can compensate a flow force by simply changing the structure of a spool without changing a structure of a sleeve itself.

To achieve these and other advantages and in accordance with the purpose of the present invention, as embodied and broadly described herein, there is provided a spool valve comprising: a sleeve having a supply channel and a return channel, a spool having a plurality of spool lands connected to one another by a spool rod, wherein the channels are opened and closed by the spool which reciprocates in the sleeve toward the longitudinal direction of the spool rod, and a flow force compensating protrusion ring formed at the supply channel on the outer circumference portion of the spool rod.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a longitudinal sectional view showing a state that a left supply channel is opened;

FIG. 3 is a longitudinal sectional view showing a state that a right supply channel is opened;

FIG. 4 is a perspective view showing a structure of the spool; and

FIG. 5 is a longitudinal sectional view showing another preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings.

In the spool valve, the flow force compensating protrusion ring can be formed at the inner side surface of the spool land as a unit, or can be formed separately from the inner side surface of the spool land with a predetermined interval.

Also, the flow force compensating protrusion ring preferably has a sectional surface of a longitudinal direction of the spool rod with a square shape.

Also, it is possible to form a chamfer at the end portion of the flow force compensating protrusion ring, and to form a groove at the supply channel of the flow force compensating protrusion ring.

In the present invention, as another means for accomplishing said purposes, a hydraulic valve and a pneumatic valve using the spool valve are proposed.

Furthermore, in the present invention, as still another means for accomplishing said purposes, a three-way valve which uses the spool valve and has a control channel, and a four-way valve having two control channels are proposed.

Hereinafter, a preferred embodiment of the present invention will be explained with reference to the attached drawings.

Figure 1:
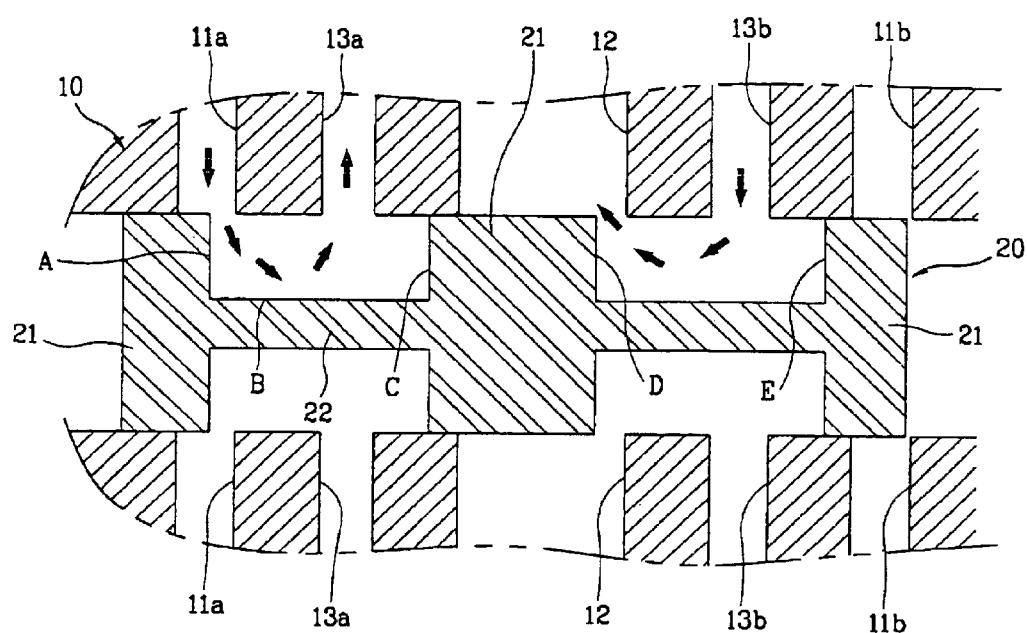
FIG. 1 is a longitudinal sectional view showing a structure of a general spool valve in accordance with the conventional art.
Figure 2:
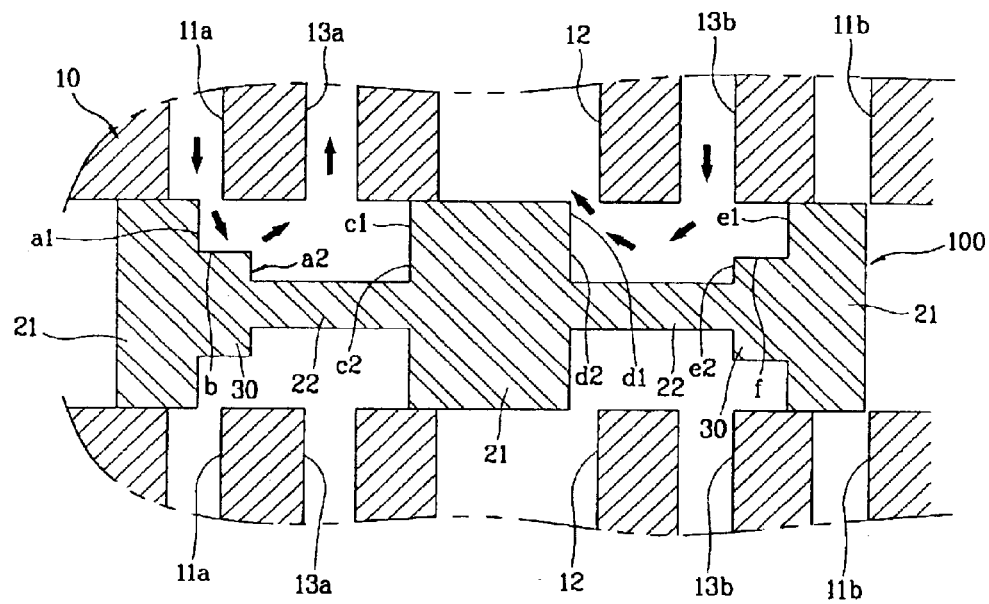
FIGS. 2 to 5 show structures of a spool valve according to the present invention.
Figure 3:
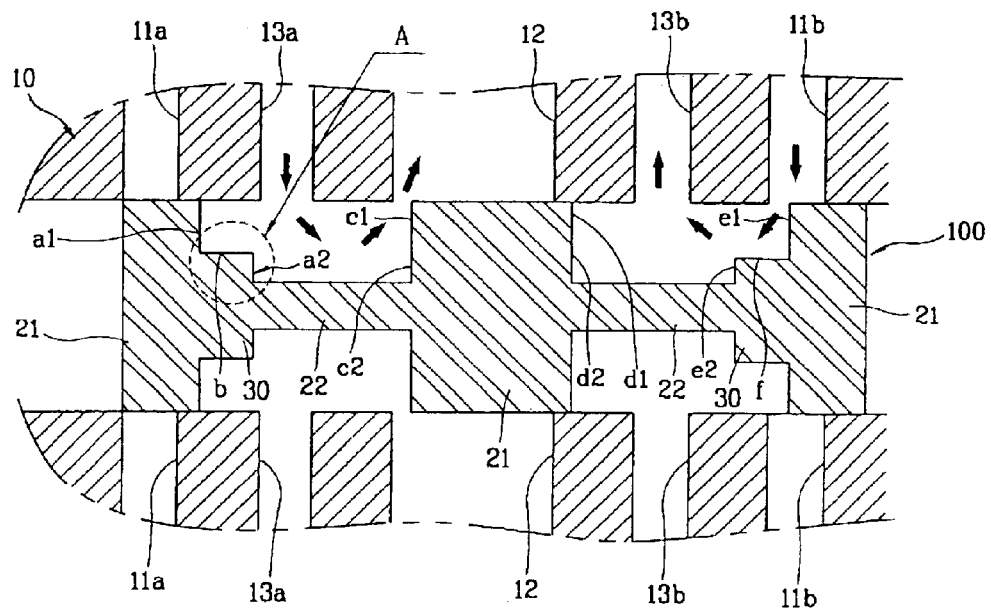
Figure 4:
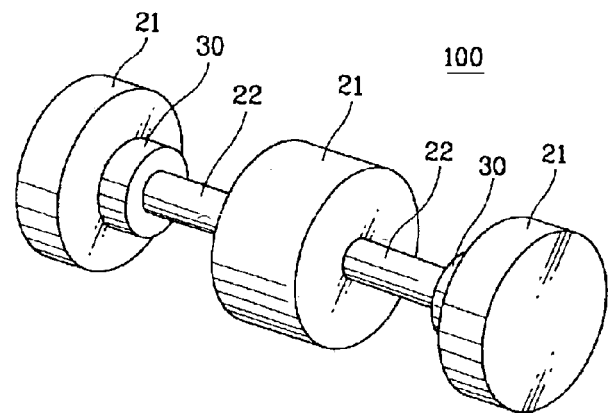
Figure 5:
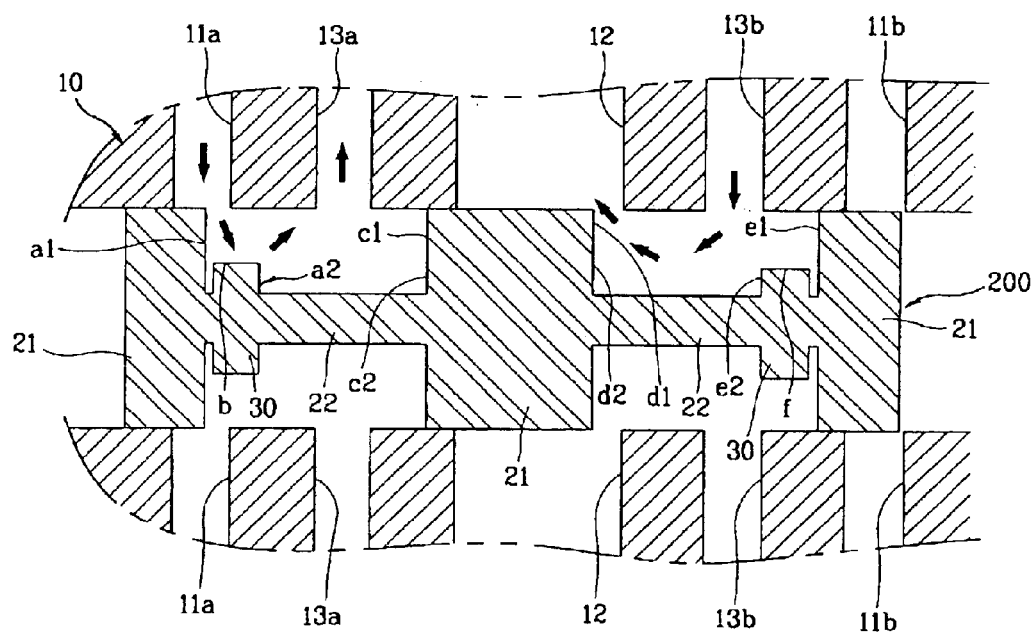

FIGS. 2 to 5 show structures of a spool valve according to the present invention, in which FIG. 2 is a longitudinal sectional view showing a state that a left supply channel is opened, FIG. 3 is a longitudinal sectional view showing a state that a right supply channel is opened, FIG. 4 is a perspective view showing a structure of the spool, and FIG. 5 is a longitudinal sectional view showing another preferred embodiment of the present invention.

As shown, the spool valve according to the present invention comprises: a sleeve 10 having a supply channel 11($11a$, $11b$) and a return channel 12; and a spool 100 having a plurality of spool lands 21 connected to one another by a spool rod 22. The spool valve for opening and closing the channels 11 and 12 by the spool 100 which reciprocates in the sleeve 10 toward the longitudinal direction of the spool rod has the same construction with the conventional art.

However, the flow force compensating protrusion ring 30 is formed at the supply channel 11 on the outer circumstance portion of the spool rod 22.

Herein, a flow of fluid which passes the spool valve will be explained.

As shown in FIG. 2, when the left supply channel is opened, the fluid supplied through the supply channel 11$a$ passes a metering orifice formed at a narrow space between an end portion of the supply channel 11$a$ and the spool land 21, thereby forming a fast flow. The fast flow does not collide with the spool rod 22 directly, but collides with a top surface b of the flow force compensating protrusion ring 30 to be reflected and flows out through the control channel 13$a$.

Accordingly, flow is generated only at the wall a1 of the spool land not at the wall a2 of the flow force compensating protrusion ring.

Also, since the fluid reflected by the flow force compensating protrusion ring 30 is directly exhausted through the control channel 13$a$, the flow is not generated at the peripheral portion of the walls c1 and c2 of the spool land, either.

Accordingly, a size of the force applied to the wall a2 of the spool land is increased as that applied to the wall c2 of the spool land, so that a magnitude of the flow force applied to the spool 100 is entirely decreased.

Also, as shown in FIG. 3, when the right supply channel 11$b$ is opened, the same effect can be anticipated.

That is, the fluid supplied through the supply channel 11$b$ passes a metering orifice formed by a narrow space between the end portion of the supply channel 11$b$ and the spool land 21, thereby forming a fast flow. The fast flow does not collide with the spool rod 22 directly, but collides with a curved surface f of the flow force compensating protrusion ring 30 to be reflected and flows out through the control channel 13$b$.

Accordingly, a magnitude of the force applied to the wall e2 of the spool land is increased as that applied to the wall d2 of the spool land, so that a magnitude of the flow force applied to the spool 100 is entirely decreased.

Also, since the fluid reflected by the flow force compensating protrusion ring 30 is directly exhausted through the control channel 13$b$, the flow is not generated at the peripheral portion of the walls d1 and d2 of the spool land, either.

Accordingly, a size of the force applied to the wall e2 of the spool land is increased as that applied to the wall d2 of the spool land, so that a size of the flow force applied to the spool 100 is entirely decreased.

A magnitude of the flow force applied to the spool valve according to the present invention is expressed as the following equation $$F_{flow\ force} = -F_{a1} - F_{a2} + F_{c1} + F_{c2} - F_{d1} - F_{d2} + F_{e1} + F_{e2}$$

Herein, when the left supply channel is opened, $F_{a2}$ and $F_c$ can be offset each other since the magnitude of the force is equal and codes are opposite. Also, when the right supply channel is opened, $F_{d2}$ and $F_{e2}$ can be offset each other since the magnitude of the force is equal and the directions are opposite to each other.

Accordingly, when compared with the conventional one, the flow force applied to the spool valve according to the present invention is decreased as a force by a pressure applied to the wall a2 of the flow force compensating protrusion ring when the left supply channel 11$a$ is opened. Also, when the right supply channel 11$b$ is opened, the flow force applied to the spool valve according to the present invention is decreased as a force by a pressure applied to the wall e2 of the flow force compensating protrusion ring.

To realize the present invention, several embodiments can be proposed.

That is, as shown in FIGS. 2 and 3, the flow force compensating protrusion ring 30 can be formed on the inner side surface of the spool land 21, or can be formed at the inner side surface of the spool land 21 with a predetermined gap therebetween.

Also, since the walls a2 and e2 of the protrusion ring have to be formed to compensate the flow force, the flow force compensating protrusion ring 30 preferably has a square-shaped sectional surface in the longitudinal direction of the spool rod.

Figure 6:
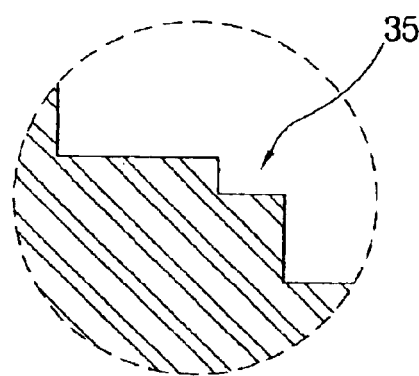
FIG. 6 is a longitudinal sectional view showing a chamfer formed at the flow force compensating protrusion ring.
Figure 7:
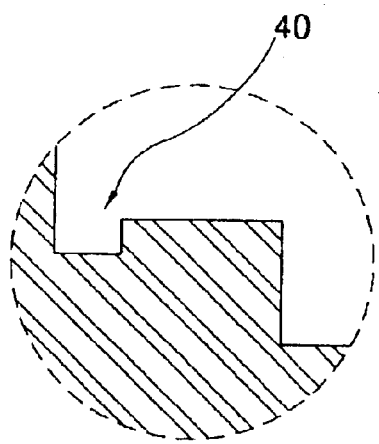
FIG. 7 is a longitudinal sectional view showing a groove formed at the flow force compensating protrusion ring.

Also, the sectional surfaces ('A' in FIG. 3) of the spool land 21, the protrusion ring 30, and the spool rod 22 have only to form a step-type structure for the flow force compensation in order to compensate the flow force. Therefore, in accordance with modified examples a chamfer 35 can be formed at the end portion of the flow force compensating protrusion ring 30 as shown in FIG. 6 or a groove 40 can be formed at the surfaces b and f of the supply channel 11 of the flow force compensating protrusion ring 30 as shown in FIG. 7.

The structure of the spool valve according to the present invention can be all applied to the hydraulic valve and the pneumatic valve, and can be all applied to the three-way control valve and the four-way control valve having one or two control channels.

The present invention provides the spool valve which can compensate the flow force by a simple structure change of the spool without requiring a structure change of the sleeve itself.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A spool valve comprising:
   a sleeve having supply channels, return channels and control channels and a spool having a plurality of spool lands connected to one another by a spool rod, said channels being opened and closed by the spool which reciprocates in the sleeve and a flow force compensating stepped shape formed on the spool rod, said stepped shape being adjacent to a spool land at a supply channel,
   wherein the stepped shape comprises a first surface which starts from the surface of spool rod and is perpendicular to the longitudinal axis of spool rod, a second surface which is parallel to the longitudinal axis of spool rod and is perpendicular to the first surface, and an end surface which is perpendicular to the second surface and is formed between the second surface and the top surface of the spool land.

2. The spool valve according to claim 1, wherein the stepped shape comprises a plurality of first surfaces and second surfaces.

3. The spool valve according to claim 1, wherein a chamfer is formed at the corner of the stepped shape.

4. The spool valve according to claim 1, wherein grooves are formed at the first surface, the second surface, the end surface, or corners of the stepped shape.

* * * * *